(12) United States Patent
Ehlers et al.

(10) Patent No.: US 8,118,186 B2
(45) Date of Patent: Feb. 21, 2012

(54) TORQUE LIMITING CAP FOR AIR CONDITIONING SERVICE PORTS

(75) Inventors: Mark S. Ehlers, Fort Wayne, IN (US); James A. Thomas, Spencerville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 995 days.

(21) Appl. No.: 12/060,295

(22) Filed: Apr. 1, 2008

(65) Prior Publication Data
US 2009/0242057 A1    Oct. 1, 2009

(51) Int. Cl.
  B65D 41/04    (2006.01)
  B65D 53/02    (2006.01)

(52) U.S. Cl. .................... 220/288; 220/304; 220/378

(58) Field of Classification Search .............. 220/288, 220/378, 304
See application file for complete search history.

(56) References Cited

U.S. PATENT DOCUMENTS

| | | | | |
|---|---|---|---|---|
| 3,937,357 A | * | 2/1976 | Burgess | 220/203.26 |
| 3,986,634 A | * | 10/1976 | Smith et al. | 220/288 |
| 4,177,931 A | * | 12/1979 | Evans | 220/288 |
| 4,299,102 A | * | 11/1981 | Aro | 70/165 |
| 4,527,406 A | * | 7/1985 | Baker | 70/165 |
| 4,765,505 A | * | 8/1988 | Harris | 220/288 |
| 5,108,001 A | * | 4/1992 | Harris | 220/203.06 |
| 5,110,003 A | * | 5/1992 | MacWilliams | 220/304 |
| 6,202,879 B1 | * | 3/2001 | Gericke | 220/255 |
| 7,954,660 B2 | * | 6/2011 | Fishman | 220/304 |
| 2004/0011788 A1 | * | 1/2004 | Harris | 220/203.26 |
| 2006/0124644 A1 | * | 6/2006 | Dehn | 220/259.3 |

* cited by examiner

*Primary Examiner* — Mickey Yu
*Assistant Examiner* — Niki Eloshway
(74) *Attorney, Agent, or Firm* — Jeffrey P. Calfa; Mark C. Bach

(57) ABSTRACT

A torque-limiting cap (100) for an air conditioning service port (14) includes an inner body assembly (122) having a retaining body (116) configured for engagement on the service port, and an outer body assembly (134) annularly disposed around the inner body assembly. The outer body assembly (134) has a first ratchet portion (140) configured for engagement with a second ratchet portion (146) that is disposed on the inner body assembly (122). When the outer body assembly (134) is torqued, the outer body assembly transmits the torque to the inner body assembly (122) from the first ratchet portion (140) to the second ratchet portion (146) to threadably engage the retaining body (116) onto the service port (14). When there is a preset amount of torque resistance, the first ratchet portion (140) slips with respect to the second ratchet portion (146) such that no additional torque is transmitted to the inner body assembly (122) from the outer body assembly (134).

14 Claims, 1 Drawing Sheet

TORQUE LIMITING CAP FOR AIR CONDITIONING SERVICE PORTS

FIELD OF THE INVENTION

The present invention relates generally to a cap for service ports, and more particularly, to a cap for air conditioning service ports.

BACKGROUND OF THE INVENTION

Typically, air conditioning service ports have a cap to prevent the loss of refrigerant from the air conditioning system. The service port of the air conditioning system typically includes a tube that is threaded on an interior surface of the tube. Conventionally, the cap has an inner body that is received around the periphery of the service port, and a threaded retaining body that is received on the interior surface of the service port. An upper sealing surface spans across the retaining body and the inner body of the cap.

When the cap is engaged on the service port, the tube of the service port is received between the retaining body and the inner body of the cap. The engagement of the threaded interior surface of the service port and the threaded retaining body, in combination with the engagement of the upper sealing surface and/or the inner body with the exterior surfaces of the service port, form a seal to prevent the loss of refrigerant.

However, when the cap is installed on the service port, it is typically installed by hand. Since there is no mechanism for the technician to provide consistent torque to each cap installed, the caps may not be properly installed on a consistent basis. Improperly tightened air conditioning caps onto service ports can result in a loss of refrigerant from the air conditioning system. This leaking of refrigerant can have a negative impact on the environment and can reduce the performance of the air conditioning system.

SUMMARY OF THE INVENTION

A torque-limiting cap for an air conditioning service port includes an inner body assembly having a retaining body configured for engagement on the service port, and an outer body assembly annularly disposed around the inner body assembly. The outer body assembly has a first ratchet portion configured for engagement with a second ratchet portion that is disposed on the inner body assembly. When the outer body assembly is torqued, the outer body assembly transmits the torque to the inner body assembly from the first ratchet portion to the second ratchet portion to threadably engage the retaining body onto the service port. When there is a preset amount of torque resistance, the first ratchet portion slips with respect to the second ratchet portion such that no additional torque is transmitted to the inner body assembly from the outer body assembly.

DESCRIPTION OF A PREFERRED EMBODIMENT

Figure 1:
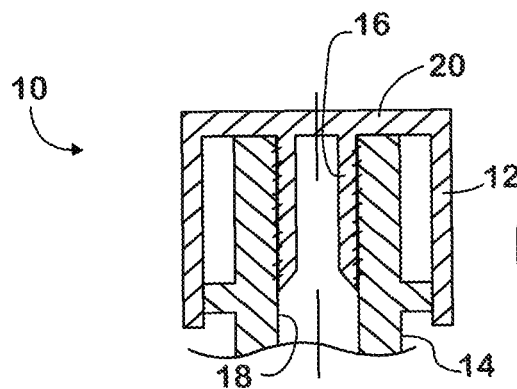
FIG. 1 is a section view of a prior art air conditioning cap and a service port.

Referring to FIG. 1, a prior art air conditioning cap is indicated generally at 10, and includes an inner body 12 that is configured to be received around the periphery of a service port 14, and a threaded retaining body 16 that is received on an interior surface 18 of the service port. An upper sealing surface 20 spans across the retaining body 16 and the inner body 12 of the cap 10. When caps 10 are installed by a technician onto service ports 14, an inconsistent amount of torque can be applied to each cap by the technician. For this reason, the caps 10 may not be properly and consistently installed on the service port 14. Improperly tightened caps 10 on the air conditioning service ports 14 can result in a loss of refrigerant from the air conditioning system.

Figure 2:
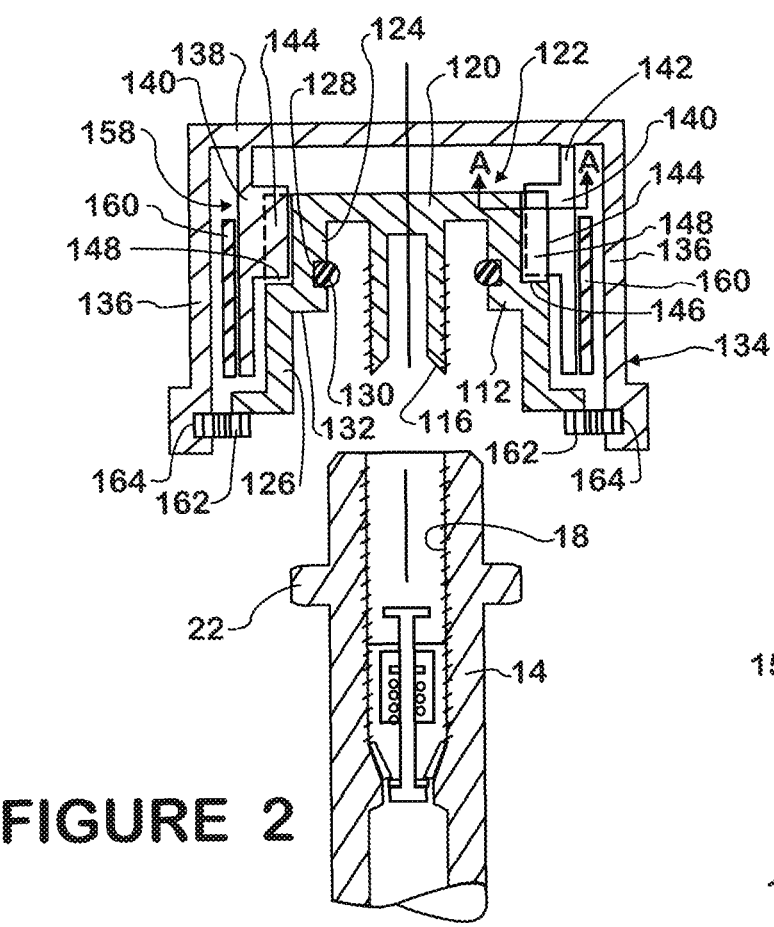
FIG. 2 is a section view of the service port and an air conditioning cap in accordance with the present invention.

Referring now to FIG. 2, a cap in accordance with the invention is indicated generally at 100. The cap 100 is configured to be received on a conventional service port 14, and includes an inner body 112 that is configured to be received around the periphery of the service port 14, and a threaded retaining body 116 that is received on the threaded interior surface 18 of the service port. An upper sealing surface 120 spans across the retaining body 116 and the inner body 112 of the cap 100.

Together, the threaded retaining body 116, the inner body 112 and the upper sealing surface 120 form the inner body assembly 122. The inner body 112 includes a first portion 124 adjacent the upper sealing surface 120 that has a first diameter, and a second portion 126 at the distal end of the inner body having a second diameter larger than the first diameter. At the first portion 124, a pocket 128 is disposed for receiving a radial O-ring seal 130, which seals the peripheral surface of the service port 14 with the inner body 112. Between the first portion 124 and the second portion 126 is a shoulder 132 that receives a locator projection 22 on the service port 14 having a generally corresponding size. When the cap 100 is engaged on the service port 14, the locator projection 22 engages the shoulder 132.

An outer body assembly 134 is generally concentrically disposed around the inner body assembly 122. The outer body assembly 134 includes an outer body 136, a top surface 138 and a first ratchet portion 140, where the outer body and the first ratchet portion are generally normal to the top surface. The top surface 138 forms a secondary sealing surface to keep moisture and debris out of the cap 100. The top surface 138 is generally parallel with the sealing surface 120, and the outer body 136 is generally concentric with the retaining body 116.

Disposed between the outer body 136 and the inner body 112 is the first ratchet portion 140. The first ratchet portion 140 includes an annular extension 142 that extends generally normally from the top surface, and a pawl 144 that extends generally radially inward from the extension. The pawl 144 of the first ratchet portion 140 is configured to engage a second ratchet portion 146 on the inner body 112.

Figure 3:
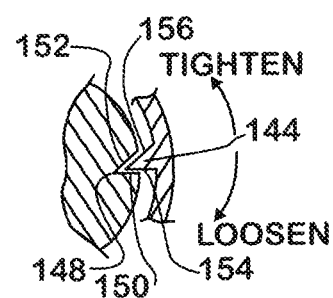
FIG. 3 is a partial section view along line A-A of FIG. 2 showing a retaining body and a ratchet in accordance with the present invention.

Formed at a peripheral surface of the inner body 112, the second ratchet portion 146 is a receiving pocket 148 configured to receive the pawl 144. As seen in FIG. 3, the receiving pocket 148 has a radial surface 150 and an angled surface 152 that generally corresponds with a radial side 154 and an angled side 156 of the pawl 144, respectively. The angle of the angled surface 152 and the angled side 156 has a component that is parallel to the tangential of the "tighten" direction.

When the technician installs the cap 100 onto the service port 14, the cap is torqued and the threads on the retaining body 116 cooperate with the threads on the interior surface of the service port. As the cap 100 is initially torqued onto service port 14, the inner body assembly 122 and the outer body assembly 134 have a generally static relationship to each other. When the technician torques the outer body assembly 134, the torque is transmitted to the inner body assembly 122 through the engagement of the pawl 144 in the receiving pocket 148. When the cap 100 is torqued to the extent that the locator projection 22 is engaged on the shoulder 132, or when the service port 14 is engaged with the sealing surface 120, or at any other present amount of torque resistance caused by the engagement of the cap onto the service port, the cap limits the torque applied to the inner body assembly 122.

The torque is limited by the cap 100 with the first ratchet portion 140 and the second ratchet portion 146, which together form a ratchet assembly 158. Due to the geometry of the pawl 144 and the receiving pocket 148, when the outer body assembly 134 is torqued, the first ratchet portion 140 slides out of the receiving pocket along the angled side 156 and the angled surface 152, respectively, and there is an interference between the first ratchet portion and the second ratchet portion 146. The first ratchet portion 140 deflects to clear the inner body 112.

A ratchet spring 160 is annularly disposed between the first ratchet portion 140 and the outer body 136 to reinforce the first ratchet portion. When the first ratchet portion 140 and the second ratchet portion 146 are in an interference, the outer body 136 and the first ratchet portion are deflected radially outward. The ratchet spring 160 provides the primary resistance to the radial outward deflection of the first ratchet portion 140.

As the technician torques the outer body assembly 134 and the first ratchet portion 140 slides past the second ratchet portion 146, torque is not transmitted to the inner body assembly 122. In this way, if the technician continues to torque the cap 100, the torque is not transmitted to the inner body assembly 122, but is instead limited to the outer body assembly 134.

When the technician uncaps the service port 14, the technician torques the cap 100 in the opposition direction. As seen in FIG. 3, when the first ratchet portion 140 is torqued in the "loosen" direction, torque is transmitted by the radial side 154 of the pawl 144 to the radial surface 150 of the receiving pocket 148 of the second ratchet portion 146. Since the radial side 154 and the radial surface 150 do not have a component parallel to the tangential of the "loosen" direction, the first ratchet portion 140 and the second ratchet portion 146 are prevented from slipping past each other in the "loosening" direction, and the torque applied from the outer body assembly 134 will be transmitted to the inner body assembly 122.

A snap ring 162 is annularly disposed in a groove 164 at the distal end of the inner body 112 and the outer body 136. The snap ring 162 maintains the inner body assembly 122 and the outer body assembly 134 together to form the cap 100, and also maintains the ratchet spring 160 between the inner body 112 and the outer body 136.

It is contemplated that any number of ratchet assemblies 158 can be annularly disposed on the cap 100. Further, it is contemplated that the pawl 144 and the receiving pocket 146 can have other shapes and sizes that permit slipping in one torqueing direction, and that prevent slipping in the other torquing direction. Advantageously, the inner body assembly 122 and the outer body assembly 134 are both formed of plastic, however other non-rigid materials are contemplated. It is also contemplated that the inner body assembly 122 can include the pawl 144, and that the outer body assembly 134 can include the receiving pocket 148.

The cap 100 provides a torque-limiting feature that enables the technician to install each cap on each service cap 14 in a consistent manner, while also ensuring that the cap forms a proper seal to prevent refrigerant loss. The cap 100 obviates the need for the technician to use a torque wrench, which is inconvenient to use. By installing the cap 100, the time and costs associated with assembling the air condition system are reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A torque-limiting cap for an air conditioning service port, comprising:
   an inner body assembly having a retaining body configured for threadable engagement on the service port, a sealing surface generally normal to the retaining body, and an inner body that extends generally perpendicularly to the sealing surface and generally outwardly annularly to the retaining body, the inner body has a first portion having a first diameter, a second portion with a second diameter larger than the first diameter, the first and second portions are generally parallel to the retaining body, disposed between the first portion and the second portion is a shoulder, and disposed at an interior surface of the first portion facing the retaining body is a pocket that houses an annular O-ring seal for sealing the service port;
   an outer body assembly disposed outwardly annularly around the inner body and disposed outwardly annularly around the retaining body, the outer body assembly having a first ratchet portion configured for engagement with a second ratchet portion disposed on the inner body;
   wherein torquing of the outer body assembly transmits torque to the inner body assembly from the first ratchet portion to the second ratchet portion to threadably engage the retaining body onto the service port, and wherein at a preset amount of torque resistance, torquing of the outer body assembly causes the first ratchet portion to slip with respect to the second ratchet portion such that no additional torque is transmitted to the inner body assembly.

2. The torque-limiting cap of claim 1 wherein the second ratchet portion comprises a receiving pocket on the inner body having a radial surface and an angled surface.

3. The torque-limiting cap of claim 1 wherein the outer body assembly comprises a top surface, an outer body generally normal to the top surface, and the first ratchet portion is concentrically disposed inwardly with respect to an outer body.

4. The torque-limiting cap of claim 1 wherein the first ratchet portion comprises an annular extension that extends generally normally from a top surface of the outer body assembly, and a pawl that extends generally radially inwardly from the annular extension, and wherein the second ratchet portion comprises a receiving pocket on the inner body assembly configured to receive the pawl.

5. The torque-limiting cap of claim 4 further comprising an annular ratchet spring disposed between the first ratchet portion and an outer body.

6. The torque-limiting cap of claim 4 wherein the pawl has a radial side and an angled side, and wherein the receiving pocket has a radial surface and an angled surface.

7. The torque-limiting cap of claim 4 wherein when the outer body assembly is torqued in a first direction, the pawl is configured for slipping with respect to the receiving pocket at the preset amount of torque resistance, and wherein when the outer body assembly is torqued in a second direction, the pawl is prevented from slipping with respect to the receiving pocket.

8. The torque-limiting cap of claim 1 wherein the first ratchet portion comprises multiple first ratchet portions disposed on the outer body assembly, and wherein the second ratchet portion comprises multiple second ratchet portions disposed on the inner body assembly.

9. The torque-limiting cap of claim 1 further comprising an annular snap ring configured to locate the inner body assembly and the outer body assembly together.

10. A torque-limiting cap for an air conditioning service port, comprising:
  an inner body assembly having a retaining body configured for threadable engagement on the service port, a sealing surface generally normal to the retaining body, and an inner body that extends generally perpendicularly to the sealing surface and generally outwardly annularly to the retaining body;
  an outer body assembly outwardly annularly disposed around the inner body, the outer body assembly including a top surface, an outer body generally normal to the top surface, a first ratchet portion that is concentrically inwardly disposed with respect to the outer body and that extends from the top surface, and a spring disposed radially between the outer body and the first ratchet portion, the first ratchet portion is configured for engagement with a second ratchet portion disposed on the inner body assembly;
  wherein when the outer body assembly is torqued in a first direction, the first ratchet portion is configured for slipping with respect to the second ratchet portion at a preset amount of torque resistance, and wherein when the outer body assembly is torqued in a second direction, the first ratchet portion is prevented from slipping with respect to the second ratchet portion; and
  wherein the inner body has a first portion having a first diameter, a second portion with a second diameter larger than the first diameter, and disposed between the first portion and the second portion is a shoulder.

11. The torque-limiting cap of claim 10 wherein an O-ring seal is disposed on the first portion.

12. The torque-limiting cap of claim 10 wherein the second ratchet portion comprises a receiving pocket on the inner body having a radial surface and an angled surface.

13. The torque-limiting cap of claim 10 wherein the first ratchet portion comprises an annular extension that extends generally normally from a top surface of the outer body assembly, and a pawl that extends generally radially inwardly from the annular extension, and wherein the second ratchet portion comprises a receiving pocket on the inner body assembly configured to receive the pawl.

14. A torque-limiting cap for an air conditioning service port, comprising:
  an inner body assembly having a retaining body configured for threadable engagement on the service port, a sealing surface generally normal to the retaining body, and an inner body that extends generally perpendicularly to the sealing surface and generally outwardly annularly to the retaining body, the inner body has a first portion having a first diameter, a second portion with a second diameter larger than the first diameter, the first and second portions are generally parallel to the retaining body, disposed between the first portion and the second portion is a shoulder, and disposed at an interior surface of the first portion facing the retaining body is a pocket that houses an annular 0-ring seal for sealing the service port; and
  an outer body assembly outwardly annularly disposed around the inner body, the outer body assembly including a top surface, an outer body generally normal to the top surface, a first ratchet portion that is concentrically inwardly disposed with respect to the outer body and extends from the top surface, and a spring disposed radially between the outer body and the first ratchet portion, the first ratchet portion is configured for engagement with a second ratchet portion disposed on the inner body assembly;
  wherein torquing of the outer body assembly transmits torque to the inner body assembly from the first ratchet portion to the second ratchet portion to threadably engage the retaining body onto the service port, and wherein at a preset amount of torque resistance, torquing of the outer body assembly causes the first ratchet portion to slip with respect to the second ratchet portion such that no additional torque is transmitted to the inner body assembly;
  wherein the first ratchet portion is a pawl having an angled side and a radial side, and the second ratchet portion is a receiving pocket having an angled surface and a radial surface.

* * * * *